J. L. KIVLAN.
COMBINED COVER AND HANDLE FOR MILK JARS AND THE LIKE.
APPLICATION FILED SEPT. 3, 1907.

920,068.

Patented Apr. 27, 1909.

WITNESSES.
William Edson
J. L. Fox

INVENTOR.
John L. Kivlan

UNITED STATES PATENT OFFICE.

JOHN L. KIVLAN, OF BOSTON, MASSACHUSETTS.

COMBINED COVER AND HANDLE FOR MILK-JARS AND THE LIKE.

No. 920,068.　　　　Specification of Letters Patent.　　　Patented April 27, 1909.

Application filed September 3, 1907. Serial No. 391,267.

*To all whom it may concern:*

Be it known that I, JOHN L. KIVLAN, a citizen of the United States, of Boston, in the county of Suffolk and State of Massachusetts, have invented a new and useful Improvement in a Combined Cover and Handle for Milk-Jars and the Like, of which the following, taken in connection with the accompanying drawings, is a specification.

My invention relates to covers and handles for milk jars and the like, and consists in combining with a handle and cover certain devices by which the cover is securely attached to the jar, and easily detached, the object being to produce a safe and convenient handle in combination with a detachable cover. This object I attain by means of the construction shown in the accompanying drawings, in which—

Figure 1:
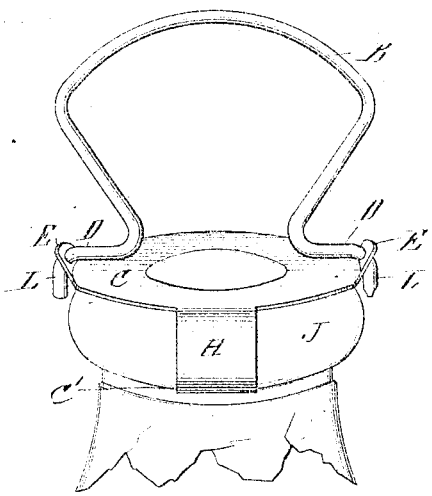
Figure 2:
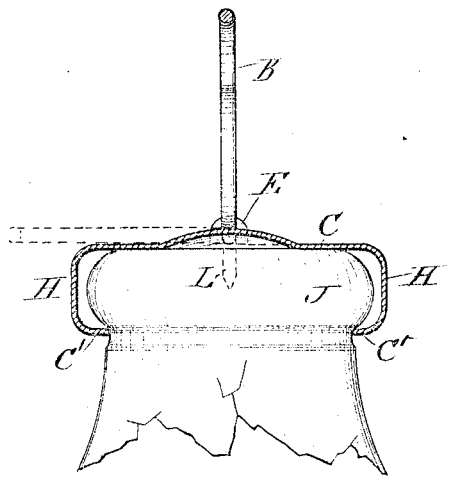

Figure 1 shows in perspective one of my combined covers and handles and a part of the neck of a milk jar; Fig. 2 is a cross-vertical section showing the cover and handle; the dotted lines show the position of the handle when it is turned down to allow of the removal of the cover.

My invention as illustrated is for a detachable cover in combination with a handle and locking device and is to be used with milk jars and other jars that have similar necks. The peculiarities of the necks and openings of the jars may be provided for by changing the details and size of the cover and its parts.

In the drawings J represents the upper part of the neck of a milk jar and C a cover, which may be made of any suitable material. I prefer stamped tin or some similar metal. This cover has two down-hanging clasps, H and H, which have inturned ends, C', C'. The clasps, H, H, are so constructed and fitted that they elastically press against the upper member of the jar as shown in Fig. 1.

The handle of the jar and cover is represented by B, and is bent as shown, so that its ends D, D, pass through turned-up ears E, E, formed on or attached to the cover C. After passing through the ears E, E, the ends are turned down so as to constitute locking-buttons, L, L, which are constructed to bear against the upper member of the neck of the jar as shown in Fig. 1, and thus keep the cover C from being worked off laterally from the mouth of the jar. One or both of the locking-buttons L may have its end made sharp, and thus serve, when the cover is not in use, as a point for penetrating the ordinary paper cover of a milk jar and thus remove it.

To place my cover upon a jar the handle B is to be turned down to the position indicated by dotted lines in Fig. 2, then the locking-buttons L, L, will be out of the way and the cover may be slipped laterally on to the top of the jar, by turning the handle up as shown in full lines the cover will be locked on as desired.

Claims.

1. A combined cover and handle for jars, comprising a cover having clasps extending downward so as to engage laterally with the upper end of the neck of a jar; a swinging handle connected with the said cover, and having its lower ends extended to form locking-buttons which are adapted to extend below the edge of the upper end of the neck of a jar and serve to prevent the cover from being forced laterally off from the top of a jar, substantially as and for the purpose set forth.

2. A jar carrier comprising a cross plate adapted to span the diameter of a jar mouth and having downwardly extending members with inturned ends, and carrying means mounted on said cross member for locking said member from lateral movement with respect to the jar on which it is mounted.

3. A jar closure comprising a metallic disk having downwardly extending arms having inturned ends, and a pair of locking arms pivotally mounted on said disk.

4. A jar closure and carrier comprising a metallic disk having depending arms with inturned ends, a carrying bail or handle movably mounted on said disk and locking means integral with said bail or handle.

5. A jar closure comprising a cross member having its ends bent downward and inward, and a bail pivotally mounted on said cross member and having end portions adapted to engage the outer surface of a jar mouth intermediate the points engaged by the inturned ends of said cross member.

6. A jar closure comprising a metallic disk having upturned perforated ears and downwardly extending means adapted to be engaged by lateral movement with the end portion of a jar neck, and locking arms pivotally mounted in said ears.

7. A jar closure comprising a metallic disk having upwardly bent perforated ears and downwardly extending members having inturned ends, and a bail pivotally mounted in said ears and having members adapted to swing downward to locking position as the bail is swung upward.

In testimony whereof, I have signed my name to this specification in the presence or two subscribing witnesses, on this twenty-first day of August A. D. 1907.

JOHN L. KIVLAN.

Witnesses:
WILLIAM EDSON,
A. C. KINGSBURY.